United States Patent
Coffey et al.

(10) Patent No.: US 6,204,948 B1
(45) Date of Patent: Mar. 20, 2001

(54) MEDIA CONVERTER

(75) Inventors: Joseph C. Coffey, Mystic; Cynthia S. Montstream, Brooklyn, both of CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 09/110,092

(22) Filed: Jul. 2, 1998

(51) Int. Cl.⁷ .................................................. H04B 10/00
(52) U.S. Cl. .......................... 359/152; 359/163; 359/153; 359/161; 375/258
(58) Field of Search .................................. 359/163, 152, 359/153, 161; 375/258; 250/551

(56) References Cited

U.S. PATENT DOCUMENTS

| | | |
|---|---|---|
| 4,168,427 | 9/1979 | Hubbard . |
| 4,227,075 | 10/1980 | Holland . |
| 4,249,264 | 2/1981 | Crochet et al. . |
| 4,249,266 | 2/1981 | Nakamori . |
| 4,531,238 | 7/1985 | Rawson et al. . |
| 4,641,375 | 2/1987 | Dean . |
| 5,063,612 | 11/1991 | McKeown . |
| 5,251,054 | 10/1993 | Lynn . |
| 5,255,111 | 10/1993 | Kwa . |
| 5,343,323 | 8/1994 | Lynn et al. . |
| 5,432,630 | 7/1995 | Lebby et al. . |
| 5,664,035 | 9/1997 | Tsuji et al. . |
| 5,799,040 | * 8/1998 | Lau ........................................ 375/258 |
| 6,025,945 | * 2/2000 | Nyu et al. ............................. 359/152 |

* cited by examiner

Primary Examiner—Jason Chan
Assistant Examiner—Hanh Phan
(74) Attorney, Agent, or Firm—Cummings & Lockwood

(57) ABSTRACT

A media converter for conversion between electrical signals and fiber optical signals includes an optical signal receiver circuit with a converter to change the optical signal into an analog electrical signal, a quantizer for converting the analog electrical signal into digital format, and an encoder for converting the signals from the quantizer into coding for wire transmission. A transformer isolates the receiver circuit from the media interface which is coupled to wire and optical cables. An optical signal transmission circuit includes a receiver for receiving the signals from metallic cable, a transformer for isolation of the transmission circuit, a decoder for converting the wire cable signals into a format for operation of an LED driver, an LED driver, an LED for producing digital light pulses, and an optical fiber interface for receiving the light pulses. The wavelength is preferably about 850 nanometers, but may also be about 1300 nanometers.

14 Claims, 3 Drawing Sheets

MEDIA CONVERTER

BACKGROUND OF THE INVENTION

The present invention relates to apparatus and methods for conversion of signals between those transmitted over bimetallic cables and those transmitted over fiber optic cables.

The use of fiber optics in the cable segment that links the equipment closest to the computer workstations for connection into a Local Area Network (LAN) has been inhibited by the relatively high cost associated with the support electronics and by technology limitations. However, this workstation to closet cable segment, normally referred to as the "horizontal segment", represents a large market because of the large number of such installations.

Recent developments in fiber optic technology have greatly reduced the cost of the support electronics for LAN devices. When this technology is viewed from the perspective of the large number of installations in which such fiber optic technology might be employed, the utilization of fiber optics in the horizontal segment becomes a cost effective reality for LAN applications.

IEEE Standard 802.3u, the governing standard for Fast Ethernet, currently defines the 100 Base-FX fiber optic standard for Fast Ethernet. This standard requires that the fiber optic devices operate at a wavelength of 1300 nm. Since Fast Ethernet requires up to 125 MHZ of bandwidth, the 1300 nm wavelength overcomes the bandwidth problems of 62.5/125 multi-mode fiber optic cable, and 100Base-FX links can operate over a distance of 2,000 meters.

If light of shorter wavelength (850 nm) could be employed effectively, it would enable a significant reduction in cost since light transmitters that generate light in the short wavelength region may be based on a light emitting diode (LED) and not a laser. This has a dramatic impact in the cost. Short wavelength receivers referred to as PINs, are also considerably lower in cost than those used in laser applications. However, short wavelength LEDs and PINs are now capable of bandwidth greater than 125 MHZ.

There are numerous LAN protocols in use today but the focus of the present invention is upon the physical connection for Fast Ethernet over multi-mode fiber using short wavelength light. At present there is no standard that defines the use of short wavelength light as a carrier wave for Fast Ethernet (i.e., 100 Mbs) data over 62.5/125 multi-mode fiber optic cable. Short wavelength generally refers to light in the 850 nanometer (nm) wavelength region.

The technical advantage of using longer wavelength light for Fast Ethernet is apparent based upon the following comparison:

| Wavelength | 850 nm | 1300 nm |
|---|---|---|
| Ratio | 160 MHZ/km[1] | 400 MHZ/km |

However, in evaluating short versus long wavelengths, two main factors should be considered:

1. LEDs and PINs designed for 1300 nm operation require a semiconductor substrate different from what is used for 850 nm devices. The difference in substrate, along with low yield rates, results in a high cost making the use of 1300 nm devices with lasers cost prohibitive.
2. Approximately 95% of all horizontal applications use a cable segment that is less than 500 meters. This distance is well within the operational envelope of short wavelength devices and bandwidth of multi-mode fiber.

Accordingly, it is an object of the present invention to provide a novel media converter including an LED to produce the light pulses for fiber optic transmission in a local area network.

It is also an object to provide such a media converter which is relatively economical to fabricate and which is relatively trouble free in operation.

Another object is to provide such a media converter which is easily adapted to operate at either 850 nm or 1250 nm.

A further object is to provide a novel method for effecting media conversion in a device using fiber optics and an LED.

SUMMARY OF THE INVENTION

It has now been found that the foregoing and related objects may be readily attained in a media converter between electrical signals and fiber optic signals comprising an optical signal receiver circuit including, seriatim, means for receiving and converting an optical signal into an analog electrical signal, a quantizer for converting the analog electrical signal into digital format, and an encoder for converting the signals from the quantizer into a coding for wire transmission. A transformer isolates the receiver circuit from a media interface for coupling to wire cables.

The converter also has an optical signal transmission circuit including, seriatim, means for receiving signals from wire cable, a transformer for isolation of the transmission circuit, and a decoder for converting the wire cable signals into a format for operation of an LED driver. An LED driver produces electrical pulses driving an LED to produce digital light pulses of a desired wavelength which pass into an optical fiber interface.

Preferably, the wavelength of the light emitted by the LED is about 850 nanometers. Alternatively, it may be relatively long wavelength, i.e., about 1300 nanometers.

Generally, the encoder/decoder converts signals between NRZ1 and MLT3 coding, and the quantizer converts the analog signal from the fiber optic receiver into an ECL format. The media converter is adapted to convert 100 Base-T electrical signals into fiber optic signals.

The components of the media converter are mounted on a PC board which is conveniently adapted to seat in a card slot of a computer, although PC board may also be designed for mounting in an auxiliary housing external to a computer such as concentrator in the equipment closet.

The method of the present invention includes providing an optical signal receiver circuit which effects the steps of receiving and converting an optical signal into an analog electrical signal, converting the analog electrical signal into a digital format, converting the digital format signals into a coding for wire transmission, and passing the coded signals to an electrical cable through a transformer to isolate the receiver circuit. The conversion method also provides an optical signal transmission circuit which effects the steps of receiving wire cable signals from a wire cable, passing the wire cable signals through a transformer to isolate the transmission circuit, converting the wire cable signals into a format for operation of an LED driver, producing electrical pulses corresponding to the converted wire cable signals, coupling the pulses to an LED to produce digital light pulses of the desired wavelength, and transmitting the light pulses into an optical fiber.

DETAILED DESCRIPTION OF THE ILLUSTRATED EMBODIMENTS

Figure 1:
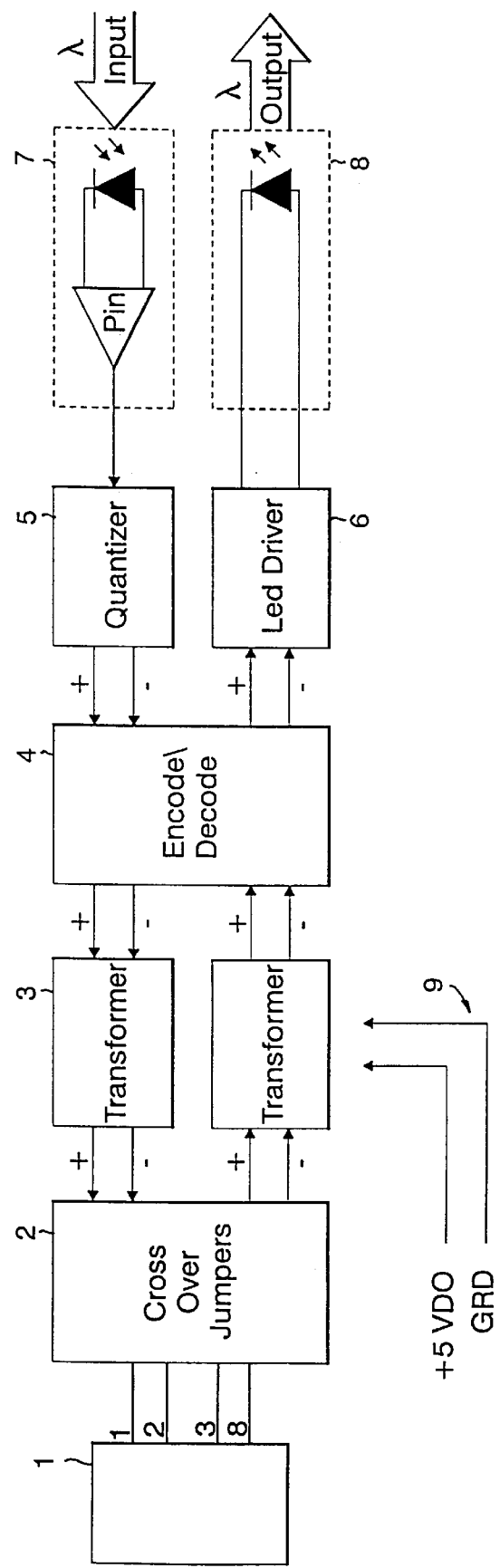
FIG. 1 is a diagrammatic view of the circuit components of the media converter of the present invention.

Turning first to FIG. 1, therein diagrammatically illustrated are the components of the media converter of the present invention. As seen at the far right, light pulses traveling along a fiber optic cable (not shown) enter the short wavelength PIN receiver 7 wherein the optical signals are converted into an analog electrical signal. The analog electrical signal then passes into the quantizer 5 which converts the analog signal from a PIN format to a digital ECL format in accordance with the preferred embodiment of the present invention. The output of the quantizer then passes into the encoder/decoder 4 wherein the NRZ1 signals from the quantizer 5 are converted to ML3 coding for transmission over a twisted copper pair cable. This electrical signal now passes through the transformer 3 to the cross over jumpers 2 and are transferred within the network through conventional copper cable connector 1, in this instance shown as an RJ-45 Category 5 connector.

On the transmit side, a signal received through the connector 1 passes to the media converter through cross over jumper 2 through a transformer 3 to the encoder/decoder 4 in which the signal is converted from MLT3 coding to NRZI coding. This signal then passes to the LED driver 6 which translates the ECL signal into LED drive signals which then actuate the LED 8 to generate the output optical signals which pass outwardly into the fiber optic cable. As schematically illustrated by the component 9, direct current to power the unit is obtained either from a printed circuit mother board or a ISA/PCI card slot, or an external power source 26 as indicated in FIG. 2.

Figure 2:
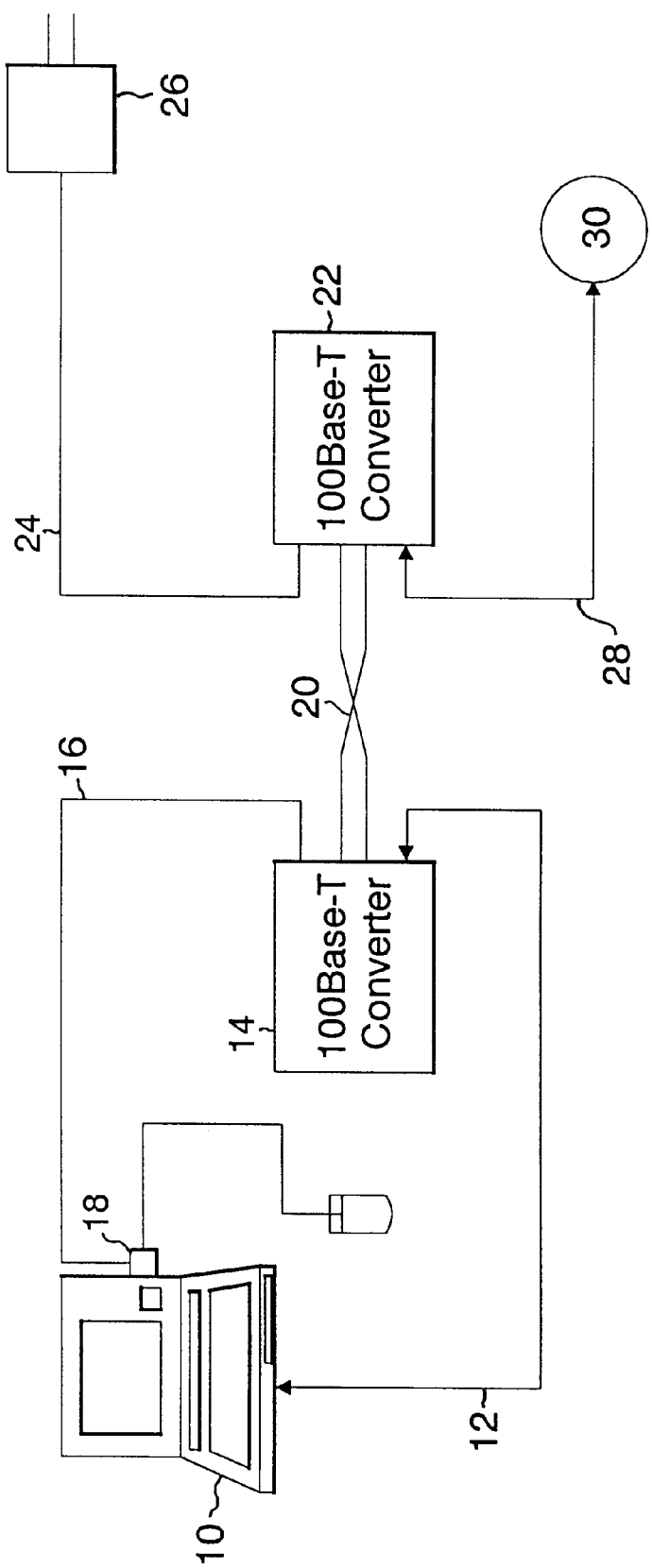
FIG. 2 is a schematic illustration of a local area network utilizing a media converter of the present invention with the converters mounted externally of the computer and server.

Turning next to FIG. 2, there is illustrated diagrammatically a local area network employing the media converter of the present invention. As can be seen, a personal computer designated by the numeral 10 has a wire cable 12 connected to an externally mounted media converter 14 embodying the present invention. It derives power through the line 16 which is connected to the mouse port 18. As shown, the media converter 14 is connected by fiber optic cable 20 to a second externally mounted media converter 22 which is deriving power through a connection 24 to an external power supply 26. The media converter 22 is also connected by wire cable 28 to a 100 Base-T hub port 30. Thus, the computer 10 is able to send signals by conventional wire cable to the media converter 14 which converts those signals into fiber optic signals which are transmitted over the fiber optic cable 20 to the media converter 22 which in turn converts the fiber optic signals to signals which are transmitted over the cable 28 to a hub port 30.

Figure 3:
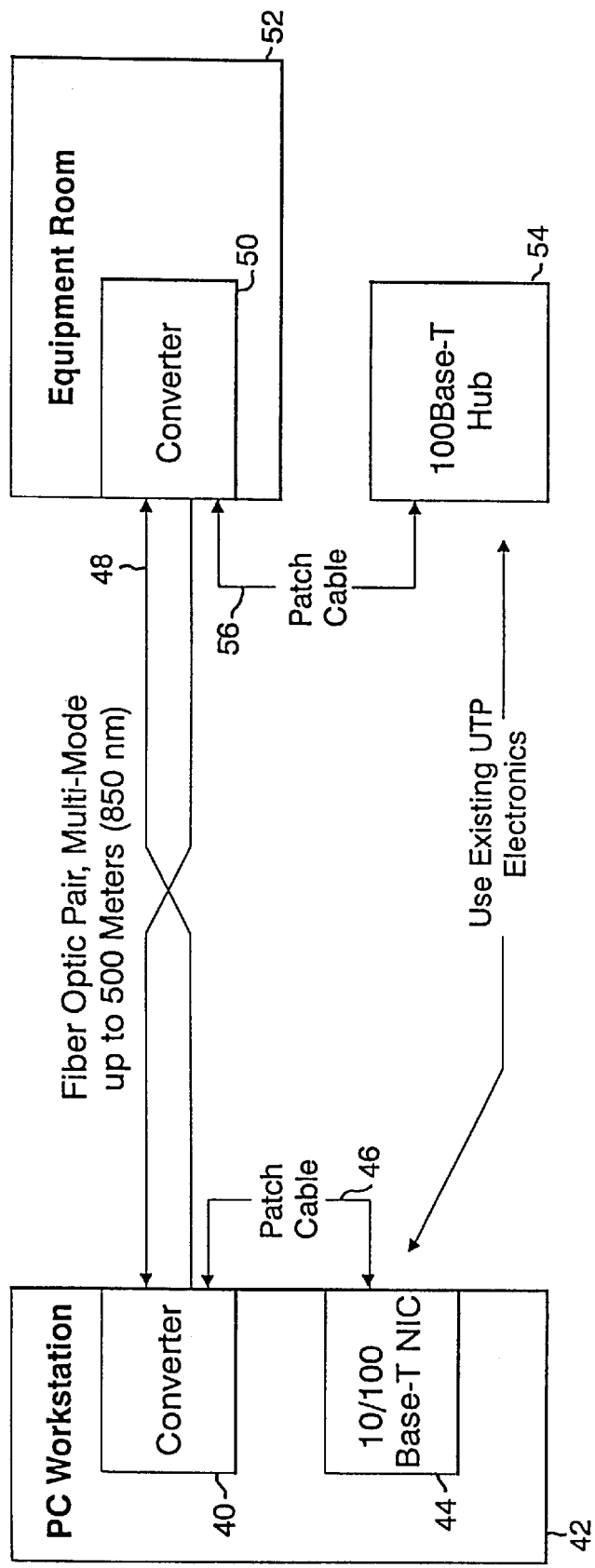
FIG. 3 is another diagrammatic view of a local area network showing the media converters of the present invention installed in a card slot of the PC and in a concentrator in the equipment room.

Turning next to FIG. 3, in this instance the media converter card 40 is inserted into a card slot within the PC 42 and is connected to the network card 44 by a standard patch cable 46. The converter card 40 in the PC 42 is again connected by fiber optic cable 48 to the converter card 50 in the concentrator 52 in the equipment room, and is connected to the network hub 54 by a patch cable 56.

The media converter components are conveniently mounted on a circuit board which can be inserted into a card slot of the PC or into a concentrator, or mounted in any other form of stand alone support enabling the connections to be made to the existing twisted pair electronics and fiber optic cable of the system.

Existing commercially available electronic components may be readily obtained to fabricate the media converters of the present invention. A specific assembly which is presently been found highly satisfactory is the following schedule of components.

| Part (As Numbered in FIG. 1) | Manufacturer and Part No. |
| --- | --- |
| 1 | BERG, 95678-001 |
| 2 | SULLINS, PTC36SA BN |
| 3 | BEL-FUSE, 6558-5999-00 |
| 4 | MICRO LINEAR, ML6673 |
| 5 | MICRO LINEAR, MC6622 |
| 6 | MICRO LINEAR, ML6633 |
| 7 | OPTEC OPF1414T |
| 8 | OPF 2416T |

As will be readily appreciated, this electronic assembly can be fabricated at relatively low cost to convert 100Base-T electrical signals into fiber optic signals utilizing an LED operating at 850 nm. This enables transmission and reception of over 500 meters of 62.5/125 multi-mode fiber optic cable. The cost of such a media converter is less than half of the cost of the conventional 100Base-FX product. To operate at a longer wavelength of 1300 nm, the same circuit configuration may be employed utilizing an LED which operates at 1300 nm. No electrical change is required and the cost of such an assembly will still be considerably less than the normal 100Base-FX product.

By providing a Fast Ethernet solution, the end user has full migration capability from 10–1000 Mbs by using fiber optics. Optical devices that use either ST or SC connectors can be employed with no change in the electrical design and the components are "off the shelf".

In operation, the media converter of the present invention passes LINK state control between the PC and the hub. If either end of the connection fails, the entire link is disabled. No additional software is required for the PC workstation and no software modifications are required either for the network or for the individual workstations.

Thus, it can be seen from the foregoing detailed description and attached drawings that the media converter of the present invention provides a low cost electronic assembly for converting electrical signals into fiber optic signals, and vice-versa. It is operable at short wavelengths of 850 nm, but if so desired, a longer wavelength of 1300 nm may also be employed. The result is that the media converter is relatively low cost, relatively trouble free in operation and readily assembled from commercially available components to provide a long lived assembly.

Having thus described the invention, what it claimed is:

1. A media converter between electrical signals and fiber optical signals comprising:
    (A) an optical signal receiver circuit including, seriatim:
        (i) means for receiving and converting an optical signal into an analog electrical signal;
        (ii) a quantizer for converting said analog electrical signal into digital format;
        (iii) an encoder for converting the signals from the quantizer into coding for wire transmission; and
        (iv) a transformer for isolation of the receiver circuit;
    (B) a media interface for coupling to wire and optical cables; and (C) an optical signal transmission circuit including, seriatim:
(i) means for receiving signals from wire cable;
(ii) a transformer for isolation of the transmission circuit;
(iii) a decoder for converting the wire cable signals into a format for operation of an LED driver;
(iv) an LED driver for producing electrical pulses;
(v) an LED for producing digital light pulses using relatively short wavelength in response to electrical pulses received from said driver; and
(vi) an optical fiber interface for receiving said light pulses .

2. The media converter in accordance with claim 1 wherein said relatively short wavelength is about 850 nanometers.

3. The media converter in accordance with claim 1 wherein said relatively long wavelength is about 1300 nanometers.

4. The media converter in accordance with claim 1 wherein said encoder/decoder converts signals between NRZ1 and MLT3 coding.

5. The media converter in accordance with claim 1 wherein said quantizer converts the analog signal from said receiving and converting means into an ECL format.

6. The media converter in accordance with claim 1 wherein said media converter is adapted to convert 100 Base-T electrical signals into fiber optic signals.

7. The media converter in accordance with claim 1 wherein the components are mounted on a PC board adapted to seat in a card slot of a computer.

8. The media converter in accordance with claim 1 wherein said components are mounted on a PC board external to a computer.

9. In a method for converting between electrical signals and optical signals, the steps comprising:
(A) providing an optical signal receiver circuit which effects the steps of:
(i) receiving and converting an optical signal into an analog electrical signal;
(ii) converting said analog electrical signal into a digital format;
(iii) converting the digital format signals into a coding for wire transmission; and
(iv) passing the coded signals to an electrical cable through a transformer to isolate the receiver circuit; and
(B) providing an optical signal transmission circuit which effects the steps of:
(i) receiving wire cable signals from said wire cable;
(ii) passing said electrical signals through a transformer to isolate the transmission circuit;
(iii) converting the wire cable signals into a format for operation of an LED driver;
(iv) producing electrical pulses corresponding to said converted wire cable signals;
(v) coupling said pulses to an LED to produce digital light pulses of relatively short wavelength in response to electrical pulses received from said driver; and
(vi) transmitting said light pulses into an optical fiber.

10. The method of converting between optical signals and electrical signals in accordance with claim 9 wherein said relatively short wavelength is about 850 nanometers.

11. The method of converting between optical signals and electrical signals in accordance with claim 9 wherein said relatively long wavelength is about 1300 nanometers.

12. The method of converting between optical signals and electrical signals in accordance with claim 9 wherein said conversion steps convert signals between NRZ1 and MLT3 coding.

13. The method of converting between optical signals and electrical signals in accordance with claim 9 wherein said analog electrical signal is converted into an ECL format.

14. The method of converting between optical signals and electrical signals in accordance with claim 9 wherein 100 Base-T electrical signals are converted into fiber optic signals and fiber optic signals are converted into 100 Base-T electrical signals.

* * * * *